Figure 1:
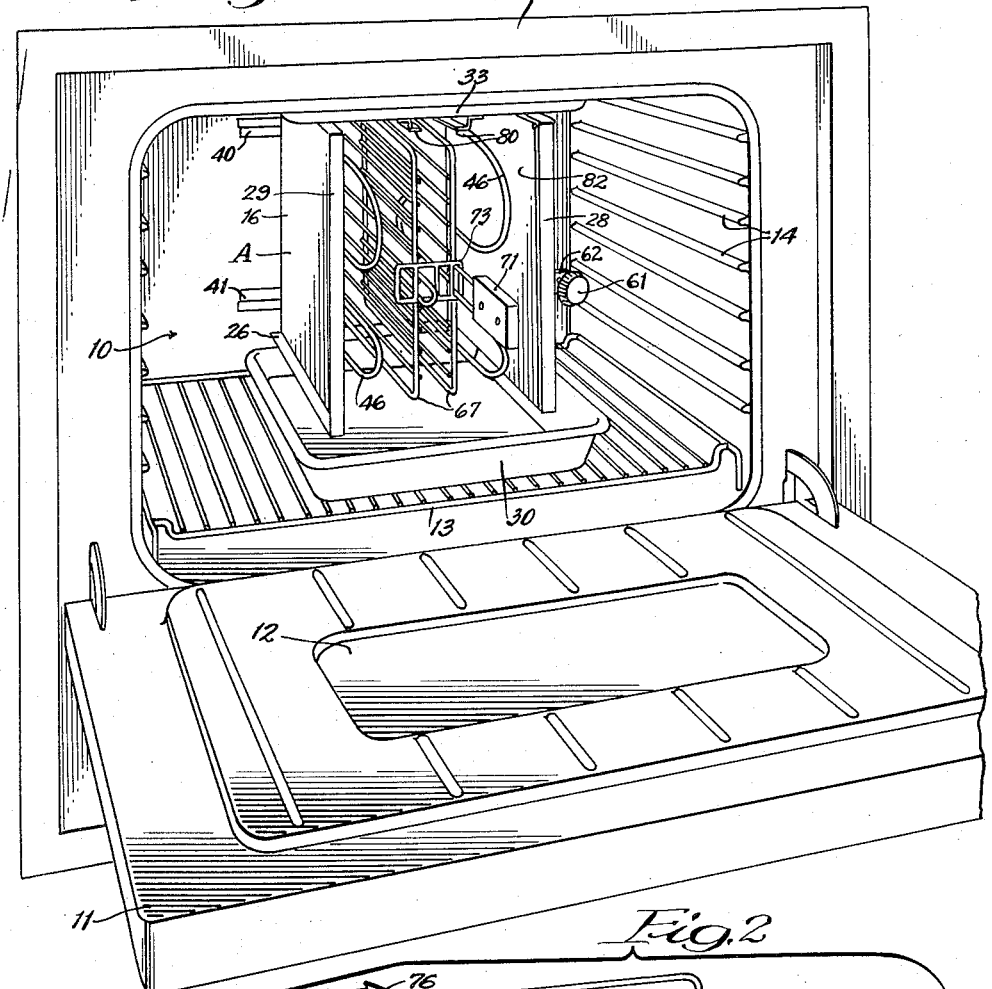

Sept. 9, 1958  H. W. WALSTON ET AL  2,851,575
PORTABLE VERTICAL BROILER AND RACK FOR ELECTRIC OVEN
Filed Nov. 1, 1955  3 Sheets-Sheet 1

INVENTORS:
Howard W. Walston and
Robert V. Stevens,
BY Dawson, Tilton & Graham,
ATTORNEYS.

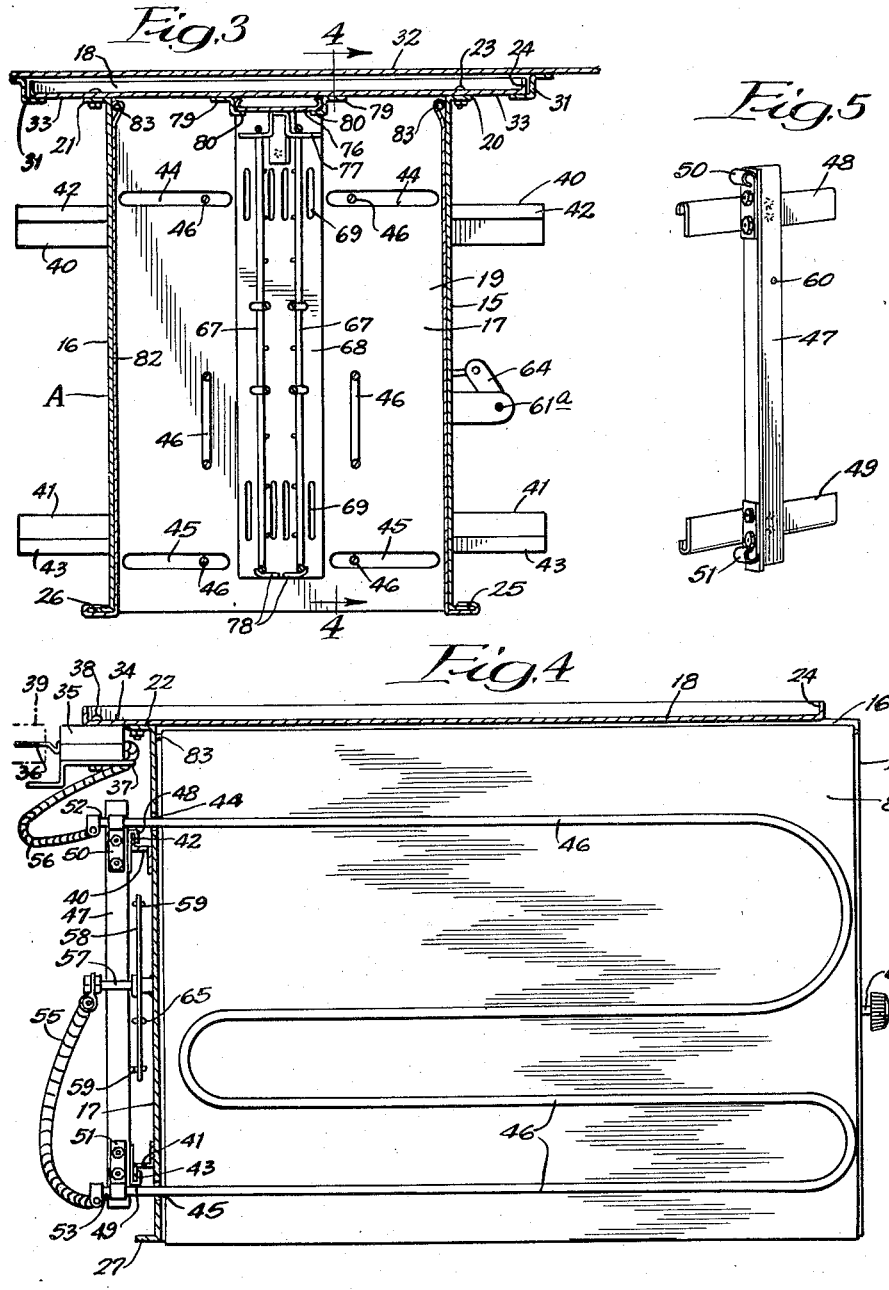

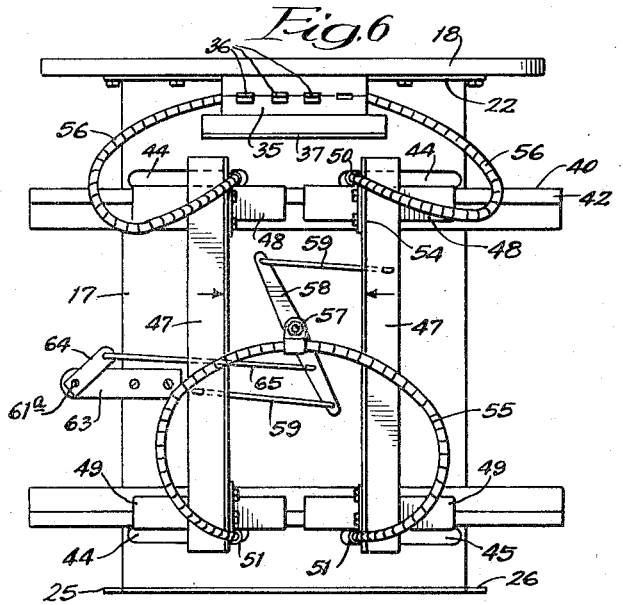
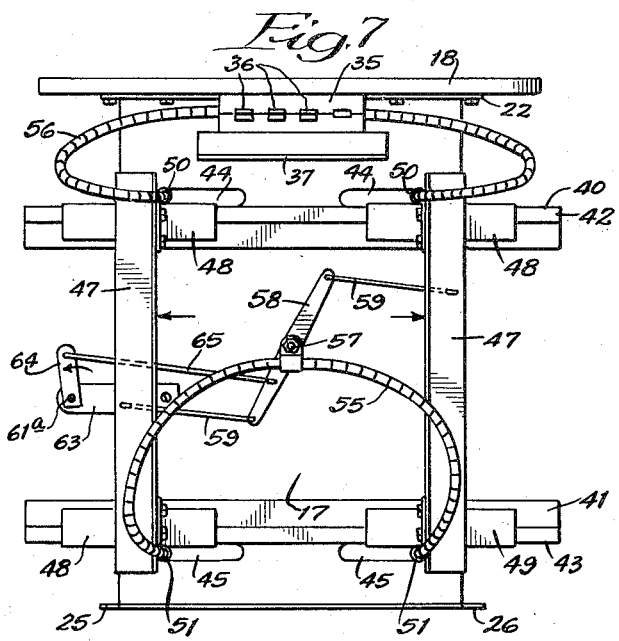

United States Patent Office 2,851,575
Patented Sept. 9, 1958

2,851,575

PORTABLE VERTICAL BROILER AND RACK FOR ELECTRIC OVEN

Howard W. Walston, Greenville, and Robert V. Stevens, Stanton, Mich., assignors, by mesne assignments, to Hupp Corporation, Detroit, Mich., a corporation of Virginia Application November 1, 1955, Serial No. 544,117

9 Claims. (Cl. 219—35)

This invention relates to vertical broilers, and more specifically to a portable broiler adapted for broiling foods on opposite sides at the same time, and particularly suited for operation in the oven compartments of electric ranges.

In modern ranges, meats and other foods are usually broiled by directly exposing them to radiant heat originating from heating elements mounted near the roofs of the broiling compartments. For example, in an electric range foods are generally broiled by placing them upon a suitable broiling pan and then positioning the pan upon an oven shelf at a predetermined distance from the oven's top electric resistance elements. Later, the shelf and pan are partly withdrawn from the oven compartment in order to turn the food and expose its opposite side to the direct heat rays.

There are a number of objections or disadvantages to the customary broiling procedures outlined above. First of all, it is well known that broiled meats and other foods are more flavorful and palatable when the original juices are retained within the food. In broiling foods in an ordinary electric range, many of these juices drain into the pan during the initial broiling step. In order to overcome this difficulty and retain more of the juices within the foods, cooking authorities recommend shortening the initial broiling step and then extending the broiling period after the food has been turned. Hence, both sides of the food are seared relatively early in the broiling operation and more of the juices are retained therein. It is believed evident, however, that this improved procedure merely reduces the problem and does not solve it.

In an ordinary broiling operation, a housewife must first determine the distance which the food is to be placed from the broiling elements. If this determination proves incorrect after broiling has commenced, the pan must be relocated upon a different shelf or the entire shelf must be repositioned within the oven compartment. Since ovens ordinarily have only a limited number of shelf positions, it is often impossible to place the food in a proper position within a broiling compartment. Furthermore, in view of the high temperatures achieved within broiling compartments, repositioning of a shelf or pan is not only awkward but may also be quite dangerous.

Fires occasionally occur during broiling operations because the pan which supports the food and receives drippings therefrom is necessarily in close proximity to the heating elements. Consequently, fat which accumulates in the pan is sometimes ignited by the nearby heating unit. In other cases, fires have been caused by fats which spatter upwardly from the broiling foods and are ignited. While in many instances an impending fire might be avoided by quickly repositioning the food within the broiler compartment, as pointed out above, such repositioning is often awkward and difficult.

One of the main objects of the present invention is to provide an electric broiler which overcomes the defects of present broiler structures, and particularly those disadvantages indicated above. Another object is to provide a compact vertical broiler adapted to be used in combination with the oven compartment of an electric range. A further object is in providing an adjustable vertical broiler which may be operated to retain nearly all of the juices within the foods broiled therein. Still another object is to provide a broiler structure which is portable and which may be easily mounted and removed from an oven compartment of a suitable electric range. A still further object is to provide a portable broiler having vertical electrical resistance elements so that both sides of a food item may be simultaneously broiled.

Figure 2:
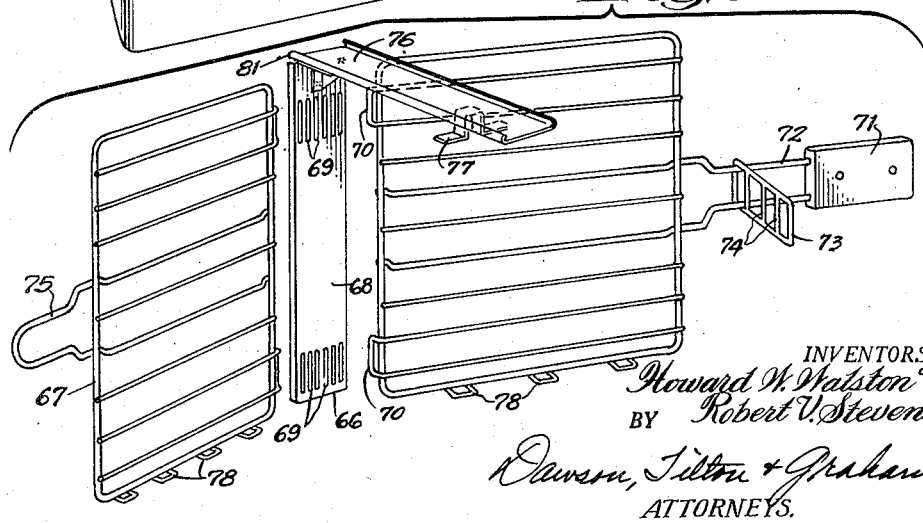

Another object is to provide an electric broiler equipped with vertically arranged heating elements and provided with an accessible and easily operated control for adjusting the relative distances between the resistance elements and the foods being broiled, and for simultaneously moving both heating elements any desired distance within practical limits from a food item carried therebetween. Still another object is to provide a vertical electric broiler in which a pair of vertical heating elements are adjustably carried by a carriage mounted on the rear wall of the broiler casing, and in which the top wall of the casing is adapted to slidably receive and suspend a food-carrying rack between the heating elements. An additional object is to provide a vertical broiler casing adapted to be suspended within an oven compartment and equipped with an adjustable and removable rack suspended between a pair of electric resistance elements. Other objects will appear from the specification and drawings, in which:

Figure 1 is a broken perspective view showing a broiler embodying the present invention, suspended within an oven compartment; Figure 2 is another perspective view showing the slidable and removable rack in disassembled condition; Figure 3 is a cross sectional view showing the broiler structure in mounted position; Figure 4 is a side sectional view taken along lines 4—4 of Figure 3; Figure 5 is a perspective view showing details of the carriage structure adapted to support the electric resistance coils; Figure 6 is a rear elevation showing parts of the broiler structure as they appear when the resistance coils are moved inwardly; and Figure 7 is a view similar to Figure 6, but shows the relationship of the parts when the electric resistance coils are moved outwardly.

Referring to the drawings, Figure 1 shows a broiler unit A embodying the present invention and being mounted within the oven compartment 10 of a range B. The range is equipped with the customary hinged door 11 having a window 12 therein, wire shelf 13 and shelf guides 14. While broiler A is particularly suited for use in the oven compartment of an electric range, it will be understood that other ranges, such as gas ranges, might be used.

As shown in Figures 3 and 4, the broiler is provided with a casing or housing comprising a pair of vertical and spaced apart side walls 15 and 16, a rear end wall 17 and a top wall 18. Together, these walls or panels define a broiling chamber 19 which is freely accessible from both the bottom and the front of the casing. Preferably, the side and end panels 15, 16 and 17 are integrally formed from a single sheet of steel or other sturdy material, bent or molded in the general shape of a U—the parallel side panels comprising the legs of the U, and the rear wall or panel constituting the base thereof. It is to be understood, however, that the side and end walls may consist of separate sheets of material connected together in any suitable manner.

The upper edges of side walls 15 and 16 and end wall 17 are turned outwardly to provide outwardly extending flanges 20, 21 and 22, respectively. These flanges not only rigidify the end and side wall structures, but also provide horizontal surfaces for the attachment of cover or top wall 18. The cover may be attached to the flanges by bolts 23 or by any other suitable means, such as riveting or welding. It will be noted that the peripheral edges of cover 18 are turned upwardly to provide an upwardly extending flange or rim 24 about the cover. In addition to strengthening the cover, rim 24 serves as a guard rail when foods are supported upon the cover following a broiling operation.

Figures 3 and 4 also show the lower edges of walls 15, 16 and 17 turned outwardly to provide flanges 25, 26 and 27. Further structural rigidity is achieved by the outwardly turned flanges 28 and 29 along the front edges of side walls 15 and 16, as shown best in Figure 1.

The lower flanges 25, 26 and 27 provide enlarged horizontal surfaces along the lower edges of the vertical walls, and are particularly suitable for supporting the broiler assembly during storage or during a broiling operation. The undersides of these lower flanges have sufficient surface area to support the broiler assembly upon an oven shelf or upon a pan carried by such a shelf. However, for most efficient operation of the broiler, it is desirable to suspend the entire structure within an oven chamber so that a suitable drip pan 30 (Figure 1) may be independently supported within the compartment, and may be removed without altering the position of the broiler. For suspending the broiler within an oven compartment, a pair of elongated parallel tracks 31 are welded or otherwise rigidly secured to the oven compartment roof 32. These tracks have inwardly turned edges spaced from the oven roof for supporting the laterally extending portions or lips 33 of cover 18 which project outwardly beyond side walls 15 and 16. Therefore, the entire broiler assembly is slidably suspended within the oven compartment and may be easily and quickly attached or removed.

In Figure 4, it will be seen that cover 18 has a rearwardly extending portion or lip 34 which projects rearwardly beyond wall 17. A pair of insulators 35 carrying contacts or plugs 36 are clamped between the underside of lip 34 and mounting member 37 by bolt 38. Contact prongs 36 extend rearwardly in opposition so that when the broiler is suspended within an oven compartment upon tracks 31, these prongs are received by a suitable electric socket 39 provided at the rear of the compartment.

A pair of spaced apart, horizontal tracks 40 and 41 extend across the back side of rear wall 17, and are welded or otherwise rigidly secured thereto. Both of the upper and lower tracks 40 and 41 project laterally beyond side walls 15 and 16 and have free edge portions 42 and 43 turned upwardly and downwardly, respectively. Rear wall 17 is provided with two pair of symmetrically disposed, horizontal slots adjacent tracks 40 and 41—one pair of upper slots 44 being directly above upper track 40, and the second lower pair of slots 45 extending directly below lower track 41.

A pair of electric resistance elements in the form of a pair of coils 46 each arranged in a vertical plane, are movably mounted within the broiler casing upon carriage means which will now be described. As best shown in Figures 5, 6 and 7, the carriage apparatus essentially comprises a pair of vertical beams 47 each being equipped with an upper and lower horizontal carriage member 48 and 49, respectively. The upper carriage members 48 are shown as elongated plates having their upper edges turned inwardly and downwardly to slidably engage the upwardly turned edge portion of upper track 40. Similarly, the lower carriage members 49 are provided with inwardly and upwardly turned lower edges adapted to slidably receive the downwardly turned portion 43 of lower track 41. Since the carriage members 48 and 49 are elongated, each of the carriage units comprising an upper and a lower carriage member and a vertical beam are movable horizontally upon tracks 40 and 41 without wobbling or binding. The horizontal carriage members may be secured to the upright beams by spot welding, as shown in Figure 5.

Adjacent the ends of each vertical beam 47 are upper and lower brackets or clamps 50 and 51 adapted to firmly grasp the free ends 52 and 53 of one of the electric coils which project through slots 44 and 45 in the rear wall of the broiler casing. Clamps 50 and 51 may be rigidly secured upon the vertical beams by bolts 54. The electrical resistance coils are preferably connected in series by flexible conduit 55 which joins the lower ends 53 of the two coils, and by flexible leads 56 which carry current between contact prongs 36 and the upper ends 52 of the coils.

The rear wall 17 of the casing is centrally provided with a rearwardly extending shaft 57 upon which a lever arm 58 is pivotally mounted. In the view presented in Figure 6, arm 58 is shown to be pivotally carried intermediate its ends and operably connected to each of the beams 47 by links 59. Each of the links or rods has one end hooked through an opening 60 (Figure 5) in one of the beams 47, and its opposite end hooked through an aperture at one end of arm 58. Therefore, when the lever arm is rotated, the carriage units are moved in opposite directions and the vertical resistance coils within broiler chamber 19 are carried either inwardly or outwardly.

Control means for rotating arm 58 and simultaneously moving coils 46 in opposite directions comprise a control knob 61 carried adjacent the front edge of wall 15 upon a rotatable shaft 61a which is mounted upon the broiler casing by side bracket 62 (Figure 1) and end bracket 63. The rear end of shaft 61a is operably connected to lever 58 by arm 64 and link 65.

A removable and adjustable rack for supporting meat or other foods between the vertical broiler coils is illustrated in Figures 1, 2 and 3. The rack consists essentially of an inverted L-shaped connecting member 66 and a pair of wire frame members 67 detachably hinged upon the vertical leg 68 of the connecting member. Adjacent each of the ends of that leg is a series of parallel and vertical slots 69. While six slots are shown in each group, it will be understood that a greater or a lesser number may be provided. Vertically corresponding slots of the two groups or series are adapted to receive pairs of hooks 70 provided by each of the wire frames. After the hooks are inserted into the slots and the frames have been swung into parallel alignment, the curved nature of the hooks prevent their withdrawal from the slots until, of course, the frames are again swung into the open position indicated in Figure 2. Since each of the frames may be hinged within several different pairs of corresponding slots, it is believed apparent that the distance between the frames may be varied to accommodate foods of different sizes therebetween.

One of the rack frames is equipped with a handle 71 riveted upon a pair of parallel bars 72 which project from that frame. A rectangular clasp 73 extends about the projecting portions of bars 72 and is provided with a plurality of successive slots defined by transverse bars 74. A wire arm 75 provided by the other frame member 67 may be inserted into any of the vertical slots or openings of clasp 73 to lock the swingable frame members in closed position. To insure proper alignment of the frames when they are in closed position, horizontal leg 76 of connecting member 66 is equipped with a support bracket 77 welded to the underside thereof. Laterally projecting tabs of the support bracket engage and support the top rung of each frame member when the frames are swung into parallel relation. In addition, the bottom rungs of frames 67 are provided with complementary wire loops or fingers 78 which tend to mesh as the frames are drawn toward each other, and which therefore prevent food from falling downwardly between the frames during a broiling operation.

As represented in Figures 1 and 3, a pair of inner tracks or channel members 79 extend longitudinally along the underside of cover 18, and are secured thereto in any suitable manner such as by welding. Channels 79 are equally spaced from the longitudinal midsection of cover 18 and are equipped with inwardly lower edge portions defining a channel for receiving the horizontal leg 76 of connecting member 66. Preferably, the lateral edges 81 of leg 76 are rolled upwardly and inwardly to strengthen the connecting member and to insure smooth sliding operation between leg 76 and channel members 79. Figure 3 shows that when the removable rack is slid into position upon channel members or tracks 79, it is automatically suspended from cover 18 at uniform distances from the paired and vertically oriented resistance coils 46.

To produce a high degree of heat ray reflection, and to protect side walls 15 and 16 from grease spattered during a broiling operation, the side walls are preferably lined with removable sheets of tin foil or aluminum foil 82. The foil liners or sheets may be mounted by folding over their top edges and hooking the sheets upon horizontal rod 83 carried by rear wall 17 and extending forwardly adjacent the intersections of side walls 15 and 16 with top wall 18 within broiler chamber 19.

Operation

Since the portable broiler of the present invention makes full use of the heat insulating walls and shelf equipment of the electric range in which it is mounted, no additional insulation for the broiler or support for the drip pan are needed. Therefore, the vertical broiler is relatively compact and may be easily stored in kitchen cabinets and the like when not in use. In order to suspend the portable broiler within an oven compartment, the broiler cover is merely aligned with the channel defined by outer tracks 31, and then slid rearwardly within the oven compartment. When prongs 36 make electrical contact with the electrical outlets at the rear of the compartment, the broiler apparatus is ready for use.

Meat or other food to be broiled is placed between the hinged wire frames 67 of the food support rack. As explained above, the relative position of the frames may be adjusted to accommodate foods of different sizes therebetween by inserting the frame hooks in different pairs of slots within the horizontal leg of the connecting member, and by slipping the wire arm 75 through any suitable opening in the movable link or clasp 73.

After the food has been firmly clasped between the wire frames of the rack, horizontal leg 76 is aligned with the channel provided by inner tracks 79, and the rack is moved inwardly to suspend the food between the vertical resistance coils 46. In most cases, it will be desirable to sear quickly both sides of the meat to retain the juices therein during the remainder of the broiling operation. To accomplish this, the operator merely rotates knob 61 to simultaneously move broiler coils 46 inwardly. Then, after the meat has been seared, the control knob is rotated in the opposite direction to shift the coils outwardly and to cook the food thoroughly with a minimum amount of juices draining into pan 30.

It is believed apparent that the positions of coils 46 may be adjusted at any time during a broiling operation. Consequently, the vertical broiler of the present invention affords considerable flexibility in the cooking of foods. For example, if an operator wishes to broil meat slowly at first in order to bathe it in its own juices and later accelerate the broiling process, the coils may be initially adjusted in outer position and later moved inwardly to any desired location. Furthermore, when a fire appears likely to start, knob 61 may be easily rotated to draw the resistance coils away from the food. However, since the vertical broiler is suspended well above drip pan 30, the possibilities of fires occurring within the drip pan are remote.

While the broiler has been described largely in connection with an oven of an electric range, it will be understood that the broiler apparatus may, if desired, be used on other work surface as, for example, on a range top. The extent of movement of the vertical resistance coils 46 is controlled or determined by the length of the slots 44. It will be understood that, if desired, the slots 44 may be shortened so as to keep the broiler elements 46 from approaching too closely to the side walls 15 and 16 so that grease may be kept from flame-flashing on the walls. If desired, a latching pin or other means may be used for retaining the casing 33 releasably within the oven so that the rack 67 may be withdrawn readily without causing the structure 33 to move forwardly too. Further, the top element 33 may be formed with circular bosses, the embossment being upwardly, so that expansion will take place in an upward direction and thus not affect the tracks upon which the broiler element is suspended.

While the portable and vertical broiler of the present invention has been disclosed in considerable detail for purposes of illustration, it will be understood by those skilled in the art that many of these details may be varied without departing from the spirit and scope of this invention.

We claim:

1. An electric broiler adapted to be detachably mounted in the oven compartment of an electric range, said oven compartment having an electrical socket in its rear wall, said broiler comprising a casing having a pair of vertical side walls, a rear wall and a top wall and being open along its lower edge, a pair of opposing electric resistance coils disposed within said casing between said side walls and projecting through said rear wall, coil support means mounted on said casing behind said rear wall for supporting said coils for movement toward and away from each other, operating means including a control member accessible from the front of said casing for simultaneously displacing said coil support means in equal and opposite increments toward and away from the center of said casing, a track assembly adapted to be rigidly secured to said oven compartment, and means on said broiler casing slidably engaging said tracks for suspending said casing within the oven compartment and for guiding said broiler casing to dispose an electrical plug mounted thereon in engagement with said socket.

2. The structure according to claim 1 together with a track assembly on the inner surface of said top casing wall, a food support rack detachably mounted within said casing between said resistance coils comprising an inverted L-shaped connecting member having a horizontal leg provided with means adapted to be supported by said track and a vertical leg, a pair of wire frame members hingedly and detachably mounted on said vertical leg, a bracket provided by said horizontal leg for supporting said frame members, and fastening means for maintaining said frame members in substantially parallel relation.

3. The structure of claim 2 in which the vertical leg of said connecting member is provided with at least one horizontal series of openings, said wire frames each being provided with a hook portion selectively insertable into the openings of said series for detachably and hingedly supporting each of said frames.

4. In combination with an electric range having an oven compartment for the baking and roasting of foods, said compartment being provided with broiler support means along the roof thereof and also being provided with an electrical outlet adjacent the rear wall thereof, a portable broiler comprising a broiler casing having top, side and rear walls defining a chamber therein and having open front and bottom sides, a pair of electrical resistance coils vertically supported within said chamber, said casing being equipped with carriage means behind said rear wall for supporting said coils within said chamber and for connecting said coils to the electrical outlet within the oven compartment, said casing also being provided with connecting means slidably and detachably engaging the support means provided along said oven compartment roof for suspending said casing therefrom, and a food support rack detachably mounted upon said casing for suspending food between the vertical resistance coils within said chamber whereby, said portable broiler may be suspended within said oven compartment for the broiling of foods between said vertical resistance coils and said portable broiler may be removed from said compartment for the cooking of foods in said oven independently of said broiler.

5. The structure of claim 4 in which each of said coils is mounted upon a vertical beam, said beams being slidably carried upon a pair of horizontal tracks provided by the rear wall of said casing and disposed therebehind, a lever arm pivotally mounted upon said casing behind said rear wall and operably connected to each of said beams for sliding said beams in opposite directions upon said tracks as said lever arm is pivoted, and control means outside of said casing for pivoting said arm and for thereby adjusting the relative horizontal positions of said vertical coils.

6. The structure of claim 4 in which said food support rack comprises an inverted L-shaped connecting member, a pair of wire frame members hingedly and detachably mounted upon one leg of said connecting member a bracket provided by the other leg of said member for engaging and supporting said frame members, and fastening means for maintaining said frame members in substantially parallel relation.

7. A portable electric broiler for ranges having oven compartments for the baking and roasting of foods comprising a broiler casing having side walls, a slotted rear end wall and a top wall extending laterally beyond said side walls, a pair of parallel track members defining a channel therebetween for slidably receiving said top wall and being adapted to be mounted upon the roof of an oven compartment for suspending said casing therein, said casing being equipped with a pair of opposing vertical electric resistance coils disposed within said casing between said side walls, coil support means disposed behind said rear wall for supporting said coils within said casing, and a vertical food support detachably mounted upon said top wall within said casing for suspension between said vertical resistance coils.

8. A portable broiler adapted for operation within an oven compartment usable for cooking foods independently of said portable broiler comprising a broiler casing have a pair of side walls, a slotted rear wall and a top wall defining a chamber shielded on four sides, said rear wall being provided with a pair of spaced apart horizontally extending tracks along the outer surface thereof, a pair of beam members each slidably carried upon said paired tracks for horizontal movement thereon, lever means pivotally mounted upon said casing behind said rear wall and operably connected to both of said beams for simultaneously sliding said beams in equal amounts in opposite directions upon said tracks when said lever means is pivoted, a pair of electric resistance coils each mounted upon one of said beams and vertically disposed between the side walls of said casing, a food support rack removably mounted upon the top wall of said casing between said electric resistance coils, and control means outside of said chamber for pivoting said lever means and thereby adjusting said vertical coils equally towards and away from said food support rack.

9. The structure of claim 8 in which said control means comprises a horizontal shaft rotatably mounted along the outer surface of one of said side walls, said shaft having a front end provided with a control knob and a rear end equipped with a lever arm, and means linking said lever arm with said pivotally mounted lever means.

References Cited in the file of this patent
UNITED STATES PATENTS

| 706,502 | Van Wie | Aug. 5, 1902 |
| 1,228,956 | Noonan | June 5, 1917 |
| 1,398,157 | Segar | Nov. 22, 1921 |
| 1,480,084 | Lamb | Jan. 8, 1924 |
| 1,586,738 | Guy-Pell | June 1, 1926 |
| 1,656,848 | Wyatt | Jan. 17, 1928 |
| 1,713,303 | Serrell | May 14, 1929 |
| 1,759,832 | Banff | May 27, 1930 |
| 1,955,867 | Wilkie et al. | Apr. 24, 1934 |
| 2,257,670 | Bossetta | Sept. 30, 1941 |
| 2,283,182 | Carl | May 19, 1942 |
| 2,314,772 | Corra | Mar. 23, 1943 |
| 2,397,040 | Pallich | Mar. 19, 1946 |
| 2,689,517 | Angelus | Sept. 21, 1954 |
| 2,693,141 | Johnson et al. | Nov. 2, 1954 |